United States Patent
Matsugami et al.

(10) Patent No.: US 11,093,134 B2
(45) Date of Patent: Aug. 17, 2021

(54) STORAGE DEVICE, MANAGEMENT METHOD, AND PROGRAM IN TIERED STORAGE SYSTEM

(71) Applicant: Hitachi, Ltd., Tokyo (JP)

(72) Inventors: Kazuki Matsugami, Tokyo (JP); Tomohiro Yoshihara, Tokyo (JP); Ryosuke Tatsumi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 40 days.

(21) Appl. No.: 16/559,866

(22) Filed: Sep. 4, 2019

(65) Prior Publication Data

US 2020/0104055 A1  Apr. 2, 2020

(30) Foreign Application Priority Data

Sep. 28, 2018  (JP) .............................. JP2018-184119

(51) Int. Cl.
*G06F 12/00* (2006.01)
*G06F 3/06* (2006.01)

(52) U.S. Cl.
CPC .......... *G06F 3/0608* (2013.01); *G06F 3/0659* (2013.01); *G06F 3/0685* (2013.01)

(58) Field of Classification Search
CPC .... G06F 3/0608; G06F 3/0659; G06F 3/0685; G06F 3/061; G06F 3/0614; G06F 3/0646; G06F 3/0647; G06F 3/0655; G06F 12/08
See application file for complete search history.

(56) References Cited

U.S. PATENT DOCUMENTS

| | | | |
|---|---|---|---|
| 2009/0144496 A1 | 6/2009 | Kawaguchi | |
| 2010/0077168 A1 | 3/2010 | Arakawa | |
| 2012/0246386 A1 | 9/2012 | Akutsu et al. | |
| 2013/0290281 A1* | 10/2013 | Yokoi | G06F 3/0685 707/693 |
| 2013/0346793 A1* | 12/2013 | Flynn | G06F 3/0679 714/6.3 |
| 2016/0021020 A1 | 1/2016 | Deguchi | |
| 2018/0052614 A1 | 2/2018 | Sawa et al. | |

FOREIGN PATENT DOCUMENTS

| | | |
|---|---|---|
| JP | 2016-511474 A | 4/2016 |
| WO | 2016/203612 A1 | 12/2016 |

OTHER PUBLICATIONS

Office Action, dated Jun. 22, 2021, which issued during the prosecution of Japanese Patent Application No. 2018-184119, which corresponds to the present application (English translation attached).

* cited by examiner

*Primary Examiner* — Shawn X Gu

(74) *Attorney, Agent, or Firm* — Baker Botts L.L.P.

(57) ABSTRACT

To combine and apply a data volume reduction technique and an automatic tier management function, the invention provides a storage system that includes a processor and a storage medium and manages and stores data in tiers. The storage system includes a first storage tier that includes a storage area for storing data, and a second storage tier that includes a storage area for storing the data which is stored in the storage area of the first storage tier and whose storage area is changed. The processor calculates an I/O volume of the data in the first storage tier, determines the tier where data is stored based on the I/O volume, and physically stores data which is stored in the second storage tier in a storage medium corresponding to the determined tier.

7 Claims, 13 Drawing Sheets

FIG. 3

207 VOL MANAGEMENT TABLE

| VOL ID (41) | VOL ATTRIBUTE (42) | VOL CAPACITY (43) | POOL ID (44) |
|---|---|---|---|
| 0 | THIN PROVISIONING | 100GB | 0 |
| 10 | COMPRESSION EFFECTIVE | 200GB | 0 |
| 20 | NORMAL VOL | 500GB | 1 |
| ... | ... | ... | ... |

FIG. 4

208 POOL CONFIGURATION MANAGEMENT TABLE

| POOL ID (51) | RAID GROUP ID (52) | POOL CAPACITY (53) | POOL USAGE CAPACITY (54) | AUTOMATIC TIER MANAGEMENT (55) |
|---|---|---|---|---|
| 0 | 0<br>1 | 10TB | 5TB | ON |
| ... | ... | ... | ... | ... |

FIG. 5

209 RAID CONFIGURATION MANAGEMENT TABLE

| RAID GROUP ID (61) | RAID LEVEL (62) | DRIVE ID (63) | DRIVE TYPE (64) | CAPACITY (65) | USAGE CAPACITY (66) |
|---|---|---|---|---|---|
| 0 | RAID5 | 0<br>1<br>2<br>3 | SSD | 5TB | 4TB |
| 1 | RAID5 | 4<br>5<br>6<br>7 | HDD | 5TB | 1TB |
| ... | ... | ... | ... | ... | ... |

FIG. 6

210 POOL ALLOCATION MANAGEMENT TABLE

| VOL ID (71) | VOL ADDRESS (72) | POOL ID (73) | POOL ADDRESS (74) | SIZE BEFORE COMPRESSION (75) | SIZE AFTER COMPRESSION (76) | QUEUE STATE (77) |
|---|---|---|---|---|---|---|
| 0 | 100 | 0 | 10 | 8KB | 4KB | Dirty |
| 0 | 200 | 0 | 10000 | 8KB | 2KB | Clean |
| ... | ... | ... | ... | ... | ... | ... |

FIG. 7

211 DRIVE ALLOCATION MANAGEMENT TABLE

| POOL ID (81) | POOL ADDRESS (82) | RAID GROUP ID (83) | DRIVE ID (84) | DRIVE ADDRESS (85) |
|---|---|---|---|---|
| 0 | 10 | 0 | 0 | 100 |
| 0 | 10000 | 1 | 5 | 1000 |
| ... | ... | ... | ... | ... |

212 TIER MANAGEMENT TABLE

| VOL ID | STORAGE AREA VOL ADDRESS | NUMBER OF WRITE I/O | NUMBER OF READ I/O | I/O FREQUENCY | VIRTUAL TIER ARRANGEMENT (RAID GROUP ID) |
|---|---|---|---|---|---|
| 0 | 0 | - | - | - | Tier2(1) |
| 0 | 500 | 50 | 100 | 250 | Tier1(0) |
| 0 | 1000 | - | 200 | 400 | Tier2(1) |
| 0 | 1500 | 100 | - | 100 | Tier1(0) |
| ... | ... | ... | ... | ... | |

STORAGE DEVICE, MANAGEMENT METHOD, AND PROGRAM IN TIERED STORAGE SYSTEM

CLAIM OF PRIORITY

The present application claims priority from Japanese patent application JP 2018-184119 filed on Sep. 28, 2018, the content of which is hereby incorporated by reference into this application.

BACKGROUND OF THE INVENTION

1. Field of the Invention

The present invention relates to automatic tier control of a storage system that includes a plurality of storage tiers.

2. Description of the Related Art

A storage system generally includes one or more storage devices. The one or more storage devices generally include, for example, a Hard Disk Drive (HDD) or a Solid State Drive (SSD) as a storage medium. The storage system is accessed from one or more upper-level devices (for example, a host computer) via a network such as a Storage Area Network (SAN) or a Local Area Network (LAN). Generally, reliability of the storage device is improved by using a high reliability method according to a Redundant Array of Independent (or Inexpensive) Disks (RAID) technique.

A compression technique and a deduplication technique which reduce a data volume are in wide use as a method of reducing the cost of a storage medium in a storage system. US Patent Application Publication 2009/0144496 (Patent Literature 1) discloses an information system capable of compressing data while maintaining a speed of writing data from a host computer. According to Patent Literature 1, the storage device is provided with a first volume that accepts data written from a host computer and a second volume that compresses and manages the data in the first volume. When data writing from the host computer to the first volume is completed, the storage device returns a response that the writing is completed to the host computer. Then, the storage device compresses the data and stores the data in the second volume at a time asynchronous with the data writing from the host computer.

On the other hand, with the diversification of a storage medium in the storage system, an automatic tier arrangement function of automatically storing data in an appropriate storage medium is in wide use. With this function, the cost of the storage medium can be reduced by storing frequently accessed data in a fast SSD and storing less-frequently accessed data in a HDD with a large capacity which is slower but less expensive than the SSD. US Patent Application Publication 2012/0246386 (Patent Literature 2) discloses an information system capable of managing the tier arrangement according to an access frequency of data. According to Patent Literature 2, by counting I/O generated during each of a long period and a short period in each storage area, a determination is executed based on a load index value defined in terms of each of the long period and the short period, and promotion (data movement to an upper tier) and demotion (data movement to a lower tier) are executed.

By combining the function of compressing data while maintaining the speed of writing data and the function of managing the tier arrangement according to the access frequency of the data which are described above, it is expected that I/O performance can be improved by increasing a data volume that can be stored in a storage medium in an upper tier, in addition to reducing the cost of the storage medium.

When the technique of data volume reduction such as compression or deduplication is used, a difference between a data size written from the host computer to the storage system and a data size written form the host computer to the storage medium is generated according to a reduced volume. Therefore, a postscript writing method (for example, Log-Structured Storage) of post-scribing the reduced data in advance is widely used as a method of efficiently using an area of the storage medium. In the postscript writing method, when data is updated, newly written data is post-scribed at a position different from a position of the data before updating, and the data before updating is an invalidated area (garbage).

When the automatic tier arrangement function is applied to the above-described postscript writing method, the number of I/O totalized in each storage area is invalidated due to the generation of garbage, and access frequency information deviates from an actual value. Since the updated data is recorded in a new area and does not take over past access frequency information, a tier arrangement suitable for the data cannot be determined. In order to take over the access frequency information in the area where the updated data is recorded, it is necessary to totalize the number of I/O per management unit of the post-scribed data. However, management information increases when the number of I/O is totalized in units from several kilobytes to hundreds of kilobytes which are handled in related examples.

SUMMARY OF THE INVENTION

The invention provides a storage system that includes a processor and a storage medium and manages and stores data in tiers. The storage system includes a first storage tier that includes a storage area for storing data, and a second storage tier that includes a storage area for storing the data which is stored in the storage area of the first storage tier and whose storage area is changed. The processor calculates an I/O volume of the data in the first storage tier, determines the tier where data is stored based on the I/O volume, and physically stores data which is stored in the second storage tier in a storage medium corresponding to the determined tier.

According to an aspect of the invention, the data volume reduction technique and the automatic tier arrangement function can be combined. Problems, configurations, and effects other than those described above will be apparent from the following description of embodiments.

BRIEF DESCRIPTION OF THE DRAWINGS

FIG. 3 is a diagram showing an example of the configuration of a VOL management table held in the storage device according to the first embodiment of the invention.

FIG. 4 is a diagram showing an example of the configuration of a pool configuration management table held in the storage device according to the first embodiment of the invention.

FIG. 5 is a diagram showing an example of the configuration of a RAID configuration management table held in the storage device according to the first embodiment of the invention.

FIG. 6 is a diagram showing an example of the configuration of a pool allocation management table held in the storage device according to the first embodiment of the invention.

FIG. 7 is a diagram showing an example of the configuration of a drive allocation management table held in the storage device according to the first embodiment of the invention.

DESCRIPTION OF THE PREFERRED EMBODIMENTS

Figure 1:
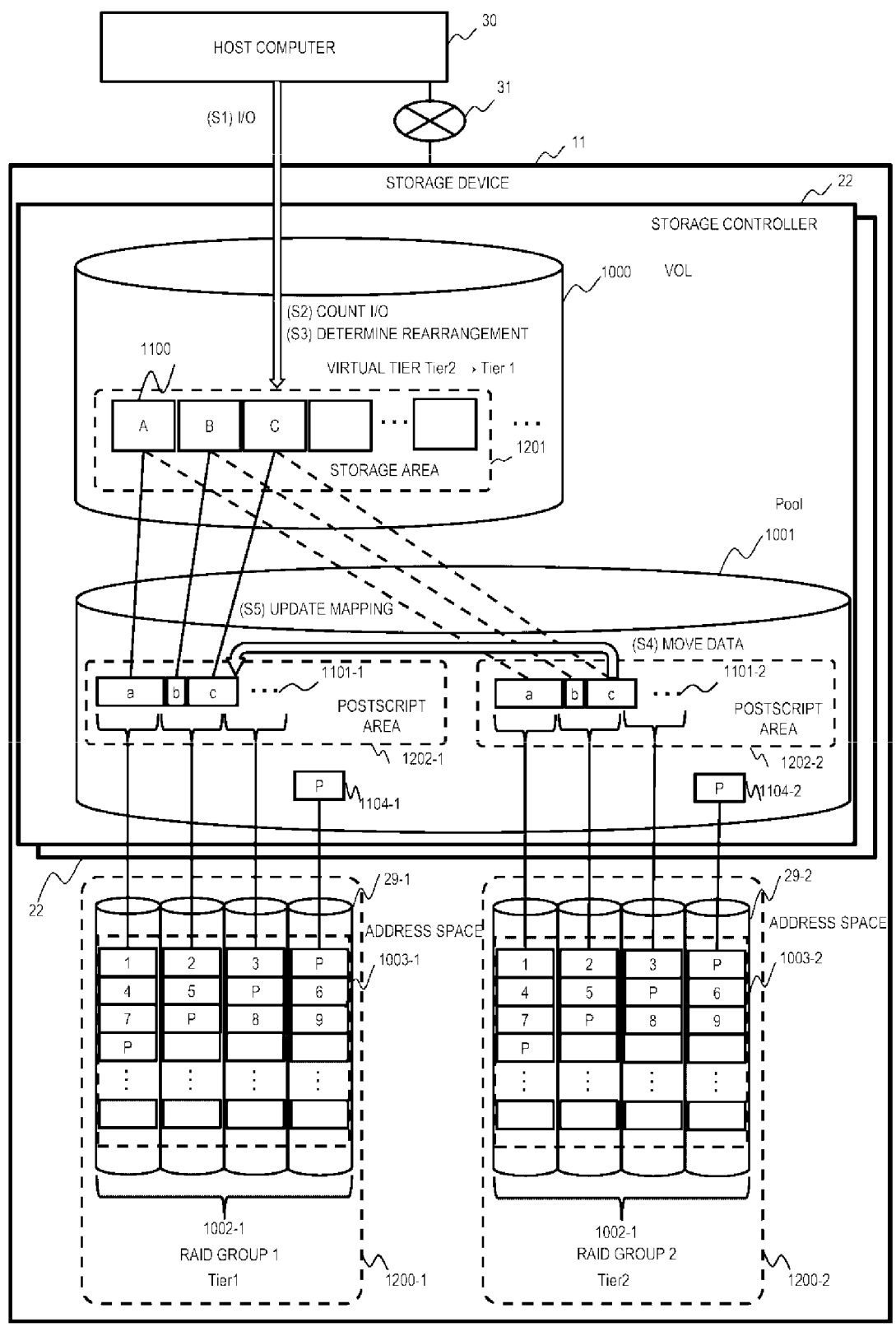
FIG. 1 is a diagram showing a tier rearrangement procedure executed by a storage system using a postscript writing method according to a first embodiment of the invention.

Embodiments of the invention will be described below with reference to the drawings. In the accompanying drawings, elements with the same function may be denoted by the same number. The accompanying drawings show specific embodiments and examples in accordance with the principles of the invention. The embodiments and examples are for the purpose of understanding the invention and should not be used to limit the invention.

Further, as will be described later, the embodiments of the invention may be implemented by software running on a general-purpose computer, may be implemented by dedicated hardware, or may be implemented by a combination of software and hardware.

Hereinafter, each processing in the embodiments of the invention may be described with "program" being the subject (subject of a processing). Since the program is run on a processor to execute a predetermined processing by using a memory or a communication port (communication control device), the processor may be described as a subject. A part of or all of the program may be implemented by dedicated hardware, or may be modularized. Various programs may be installed in computers by a program distribution server or a storage medium.

In the following description, an "interface unit" may include at least one of a user interface unit and a communication interface unit. The user interface unit may include at least one I/O device of one or more I/O devices (for example, an input device such as a keyboard and a pointing device, and an output device such as a display device) and a display computer. The communication interface unit may include one or more communication interface devices. The one or more communication interface devices may be one or more communication interface devices of the same type (for example, one or more Network Interface Cards (NIC)), or may be two or more communication interface devices of different types (for example, an NIC and a Host Bus Adapter (HBA)).

In the following description, a "memory unit" includes one or more memories. At least one of the memories may be a volatile memory or a nonvolatile memory. The memory unit is mainly used in a processing executed by a processor unit.

In the following description, a "processor unit" includes one or more processors. At least one of the processors is typically a Central Processing Unit (CPU).

In the following description, although information is described in an expression of "xxx table", information may be described with any data structure. That is, the "xxx table" can be referred to as "xxx information" to indicate that the information does not depend on the data structure. In the following description, the configuration of each table is an example, one table may be divided into two or more tables, and all or a part of two or more tables may be one table.

Further, although data compression is described below as an example of a data volume reduction method, the data compression may be replaced with data deduplication. In a data deduplication processing, duplicate parts are held as shared data files among a plurality of data files, and a total volume of held data is reduced by associating each data file with the shared data file.

In the following description, a common reference numeral in reference numerals may be used when elements of the same type are described without distinction, and a reference numeral (or an element ID such as an identification number) may be used when the elements of the same type are described with distinction. For example, when a plurality of storage controllers are described without distinction, the storage controllers are described as "storage controllers 22"; and when the storage controllers are described with distinction, the storage controllers are described as "storage controller 1_22A" and "storage controller 2_22B". The same applies to other elements (for example, a cache area 203, a buffer area 202, an allocation destination address 1100, and the like).

In the following description, a "storage system" includes one or more storage devices. At least one of the storage devices may be a general-purpose physical computer. Further, at least one of the storage devices may be a virtual storage device, or may execute Software-Defined anything (SDx). For example, a Software Defined Storage (SDS) (an example of the virtual storage device) or a Software-defined Datacenter (SDDC) can be adopted as the SDx.

Embodiments of the invention will be described below with reference to the drawings.

First Embodiment

A first embodiment of the invention will be described below.

(Tier Rearrangement Procedure Using Postscript Writing Method)

FIG. 1 is a diagram showing a tier rearrangement procedure executed by a storage system 100 using a postscript writing method according to the first embodiment of the invention.

The storage system 100 is configured by a host computer 30 and a storage device 11. The host computer 30 is connected to the storage device 11 via a network 31 and is managed by a management computer (not shown).

The storage device 11 is internally provided with two or more storage controllers 22, and provides one or more volumes 1000 including a plurality of logical storage areas 1201 to the host computer 30.

The host computer 30 may be a physical computer or a virtual computer executed by a physical computer. The host computer 30 may be a virtual computer executed in the storage system 100.

Data is written (or read) from the host computer 30 to the storage area 1201 in the volume (VOL) 1000. At the time of accessing, the host computer 30 specifies an allocation destination address 1100 where the data is stored, so that the storage device 11 determines a logical storage position for the data.

The storage controller 22 specifies the storage area 1201 to compress written data, and allocates the compressed data in a postscript address 1101 of a postscript area 1202 in a pool 1001 that is a physical data storage area. That is, data is written to the pool 1001 after an area (one or both of a position or a size of the data) is changed.

The storage controller 22 generates parity when data of a parity cycle is allocated to the postscript area 1202. Then, the storage controller 22 stores the compressed data and the parity in an address space 1003 of a RAID group 1002 that belongs to a tier 1200 corresponding to the postscript area 1202.

At this time, performance of the entire storage system is improved by preferentially storing data that is accessed from the host computer 30 at a high frequency in a Tier 1_1200-1 of an upper tier.

The storage device 11 of the first embodiment shows an example in which a reading and writing speed from and to the Tier 1_1200-1 is higher as compared to a Tier 2_1200-2. The tiers of the storage device 11 can be configured by an index such as latency, capacity, or availability, and is not limited to the speed.

In the first embodiment, the storage system 100 executes rearrangement of the Tier 1200 after I/O from the host computer 30. A specific example is as follows.

(S1) The storage device 11 receives a write command or a read command from the host computer 30 via the network 31. When a command is received, the storage controller 22 executes a write processing or a read processing requested by the host computer 30. In the first embodiment, after an I/O processing is completed, data A, B, and C are allocated to the storage area 1201, and compressed data a, b, and c corresponding to the data A, B, and C are allocated to a postscript area 1202-2 where a storage position is the Tier 2_1200-2.

(S2) When the write command or the read command is accepted, the storage controller 22 counts the number of I/O of the writing and the reading in each storage area 1201 which is a logical area where an I/O request (command) is received. Compared to the automatic tier arrangement function in the above-mentioned related example in which the number of I/O is totalized for a physical storage area, the number of I/O is totalized for the logical (or virtual) storage area 1201 in the first embodiment.

Accordingly, the number of I/O can be continuously counted without being influenced by a data movement between the tiers in the storage area 1201.

(S3) The storage controller 22 determines a virtual tier arrangement suitable for a data storage position based on the number of I/O totalized for each storage area 1201 at the time of totalizing the number of I/O or at a periodical time. When the storage controller 22 determines that the virtual tier arrangement suitable for the data is the Tier 1_1200-1 while the tier storing the data during the determination is the Tier 2_1200-2, the data rearrangement is executed on the Tier 1_1200-1 by a virtual tier arrangement.

(S4) The storage controller 22 moves the compressed data a, b, and c to the corresponding postscript area 1202-1 in the Tier 1_1200-1 which is a rearrangement destination.

(S5) The storage controller 22 updates mapping information of a logical address and a physical address so as to associate the compressed data a, b, and c moved in the above (S4) with the data A, B, and C in the storage area 1201.

The above-described steps are an example of the tier rearrangement. It should be noted that the postscript writing method is Log-Structured Storage which is similar to the above-mentioned example, and is a file system in which writing is implemented by only post-scribing a change difference.

(Storage Device)

Figure 2:
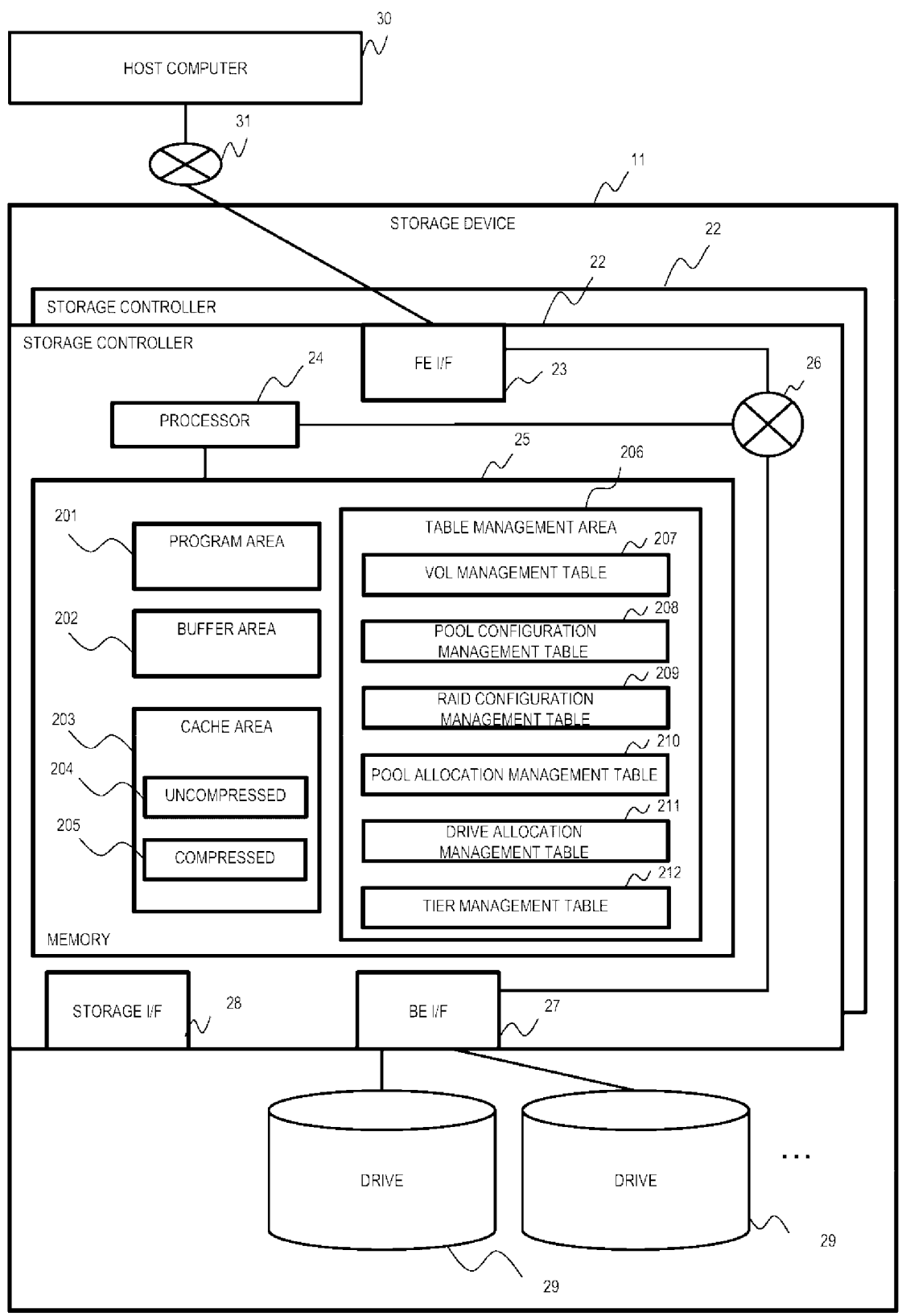
FIG. 2 is a block diagram showing the configuration of the storage device according to the first embodiment of the invention.

FIG. 2 is a block diagram showing the configuration of the storage device 11 according to the first embodiment of the invention. The storage device 11 includes one or more storage controllers 22 and various drives 29 connected to the one or more storage controllers 22.

The storage controller 22 includes a Front-End Interface device (FE_I/F) 23 that communicates with the host computer 30, a storage interface device (storage I/F) 28 that executes communication between the storage devices, a processor 24 that controls all devices, a memory 25 that stores information and a program used by the processor 24, a Back-End Interface device (BE_I/F) 27 that communicates with a drive 29, and an internal network 26 that connects the above devices.

The memory 25 includes a program area 201 that manages a control program, a buffer area 202 that is a temporary storage area at the time of transferring and copying data, a cache area 203 that temporarily stores write data (data to be written in response to a write command) from the host computer 30 and read data (data to be read in response to a read command) from the drive 29, and a table management area 206 that stores various tables.

The processor 24 executes a control program loaded in the program area 201 to execute a write processing or a read processing and provide various functions of the storage device 11.

The cache area 203 includes an uncompressed data storage area 204 for temporarily storing write data from the host computer 30, and a compressed data storage area 205 for storing compressed data.

The table management area 206 stores a VOL management table 207 that holds information related to the VOL 1000, a pool configuration management table 208 that holds information related to the pool 1001, a RAID configuration management table 209 that holds information related to a RAID configuration, a pool allocation management table 210 that holds information related to pool allocation, a drive allocation management table 211 that holds information related to drive allocation, and a tier management table 212 that holds information related to the number or the frequency of I/O for each storage area.

The drive 29 is a device having a nonvolatile data storage medium, and includes a plurality of types of drives with different performance. The drive 29 is configured by, for example, a Hard Disk Drive that has an interface such as a Fibre Channel (FC), a Non-Volatile Memory Express (NVMe), a Serial Attached SCSI (SAS), and a Serial Advanced Technology Attachment (SATA), and a Solid State Drive (SSD) whose I/O throughput performance and I/O response performance are higher than those of a Hard Disk Drive.

Tiers are formed by classifying the drives 29 of the plurality of types into drive groups having similar performance. A relationship between the tiers is defined by a relationship of high performance and low performance. For example, Tier 1 to Tiers 2 and 3 are defined in a descending order of performance (for example, SSD). Further, assuming that an old model or the like that is no longer used is connected as an external storage, a Tier at the bottom may be defined on a premise that performance is low, or a user may set a tier according to the performance of the external storage via a management I/F.

The SSD is a semiconductor storage medium having a plurality of flash memories and an SSD controller that controls these flash memories, and an appearance shape or the like of the semiconductor storage medium is not limited to a form factor. A nonvolatile semiconductor memory such as an NOR or an NAND may be used in the flash memories. Instead of the flash memories, various kinds of semiconductor memories such as a Magnetoresistive Random Access Memory (MRAM) that is a magnetoresistive memory, a Resistance Random Access Memory (ReRAM) which is a resistance change type memory, and a Ferroelectric Random Access Memory (FeRAM) which is a ferroelectric memory, may be used.

The FE_I/F 23, the BE_I/F 27, and the storage I/F 28 are examples of the interface unit. The memory 25 is an example of the memory unit. The processor 24 is an example of the processor unit.

(VOL Management Table)

FIG. 3 is a diagram showing an example of the configuration of the VOL management table 207 held in the storage device 11 according to the first embodiment of the invention.

The VOL management table 207 has an entry for each VOL 1000. Each entry shows information of VOL_ID 41, VOL attribute 42, VOL capacity 43, and pool ID 44. Hereinafter, one VOL (a "target VOL" in the description of FIG. 3) will be described as an example.

The VOL_ID 41 is an ID (identification information) of the target VOL. The VOL attribute 42 shows an attribute of the target VOL (for example, whether the target VOL is a VOL to which thin provisioning is applied or is a normal VOL, or whether compression is validated). The VOL capacity 43 shows a capacity of the target VOL. The pool ID 44 is an ID of the pool 1001 associated with the target VOL.

The processor 24 can determine whether the VOL 1000 requires data compression by referring to the VOL attribute 42 in the VOL management table 207. For example, if the VOL attribute 42 shows "compression is validated", the processor 24 executes a data compression processing.

(Configuration Management Table)

FIG. 4 is a diagram showing an example of the configuration of the pool configuration management table 208 held in the storage device 11 according to the first embodiment of the invention.

The pool 1001 is a logical storage area which is configured based on one or more RAID groups 1002. The pool configuration management table 208 has an entry for each pool 1001. Each entry shows information of pool ID 51, RAID group ID 52, pool capacity 53, pool usage capacity 54, and whether or not automatic tier management 55 is applied (ON/OFF). Hereinafter, one pool (a "target pool" in the description of FIG. 4) will be described as an example.

The pool ID 51 is an ID of the target pool. The RAID group ID 52 is an ID of each of the one or more RAID groups 1002 based on the target pool. The pool capacity 53 shows a capacity of the target pool. The pool usage capacity 54 shows a total volume of an area which is allocated to the VOL 1000 in a pool capacity of the target pool. The automatic tier management 55 shows whether the target pool is a target of the automatic tier management.

FIG. 5 is a diagram showing an example of the configuration of the RAID configuration management table 209 held in the storage device 11 according to the first embodiment of the invention.

The RAID configuration management table 209 has an entry for each RAID group 1002. Each entry shows information of RAID group ID 61, RAID level 62, drive ID 63, drive type 64, capacity 65, and usage capacity 66. Hereinafter, one RAID group (a "target RAID group" in the description of FIG. 5) will be described as an example.

The RAID group ID 61 is an ID of the target RAID group. The RAID level 62 shows a type of a RAID algorithm applied to the target RAID group. The drive ID 63 is an ID of each of the one or more drives 29 that form the target RAID group. The drive type 64 shows a type of the drive (for example, an HDD or an SSD) that forms the target RAID group. The capacity 65 shows a capacity of the target RAID group. The usage capacity 66 shows a capacity that is used in the capacity of the target RAID group.

(Allocation Management Table)

FIG. 6 is a diagram showing an example of the configuration of the pool allocation management table 210 held in the storage device 11 according to the first embodiment of the invention.

The pool allocation management table 210 has an entry for each VOL address (an address showing a slot in the VOL). Each entry shows information of VOL_ID 71, VOL address 72, pool ID 73, pool address 74, size before compression 75, size after compression 76, and queue state 77. Hereinafter, one VOL address (a "target VOL address" in the description of FIG. 6) will be described as an example.

The VOL_ID 71 is an ID of the VOL to which a slot identified by the target VOL address belongs. The VOL address 72 is an address of the target VOL. The pool ID 73 is an ID of the pool 1001 including a storage area allocated to the target VOL address.

The pool address 74 is an address (an address belonging to the pool 1001) of the storage area allocated to the target VOL address. The size before compression 75 shows a data size before compression according a write command which specifies the target pool address. The size after compression 76 shows a data size after compression according to the write command which specifies the target pool address.

The queue state 77 shows a storage position of data. "Dirty" indicates that the data exists in the cache area 203 only, "clean" indicates that the data is written to the drive 29, and "Cache Miss" indicates that the data exists in the drive only.

It should be noted that the above-mentioned slot is one of management units of a storage area used by the storage controller 22. The storage controller 22 in the first embodiment manages a storage area in three units which are a chunk of a plurality of kilobytes, a slot in which 32 chunks are combined, and a page for managing slots in units of 42 MB.

FIG. 7 is a diagram showing an example of the configuration of the drive allocation management table 211 held in the storage device 11 according to the first embodiment of the invention.

The drive allocation management table 211 has an entry for each pool address. Each entry shows information of pool ID 81, pool address 82, RAID group ID 83, drive ID 84, and drive address 85. Hereinafter, one pool address (a "target pool address" in the description of FIG. 7) will be described as an example.

The pool ID 81 is an ID of the pool 1001 to which the target pool address belongs. The pool address 82 is an address of the target pool. The RAID group ID 83 is an ID of a RAID group based on a storage area showing the target pool address.

The drive ID 84 is an ID of the drive 29 based on the storage area showing the target pool address. The drive address 85 is a drive address corresponding to the target pool address.

(Logical Storage Tier)

Figure 8:
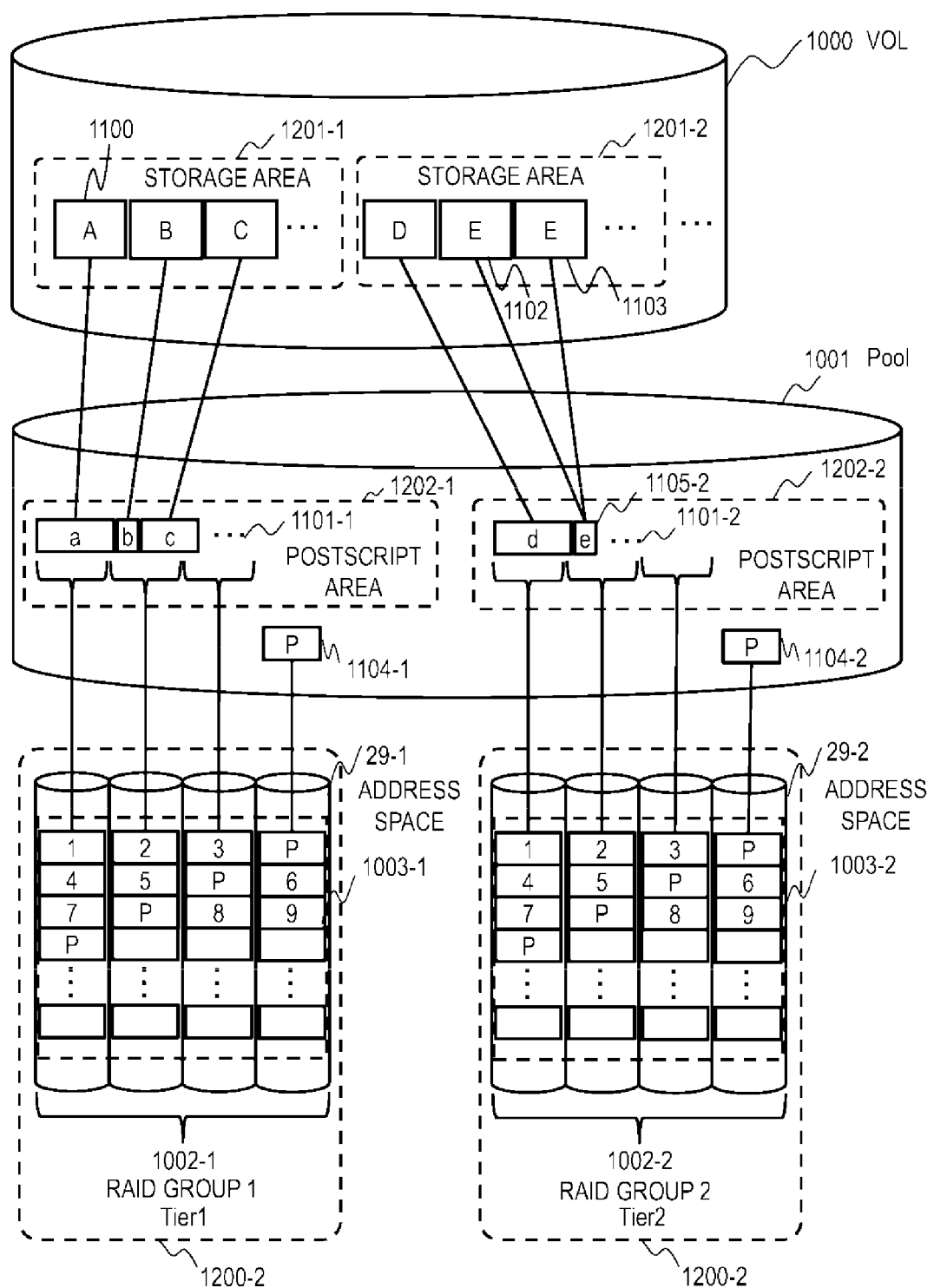
FIG. 8 is a diagram showing an example of the configuration of a logical storage tier managed by the storage device according to the first embodiment of the invention.

FIG. 8 is a diagram showing an example of the configuration of a logical storage tier managed by the storage device 11 according to the first embodiment of the invention.

The VOL 1000 is provided to the host computer 30. Further, due to copying or deduplication, one pool address may be pointed from management units (slots) of a plurality of logical data in the VOL 1000, and one pool address may be pointed from a plurality of VOL slots.

In the example of FIG. 8, two different slots (VOL addresses) 1102 and 1103 point to a same pool address 1105-2. An allocation of the pool 1001 from the VOL 1000 is managed based on the pool allocation management table 210. An allocation from the pool 1001 to the address space 1003 (that is, a plurality of address spaces provided by a plurality of drives 29 that form the RAID group 1002) is managed based on the drive allocation management table 211.

(Tier Management Table)

Figures 9, 10:
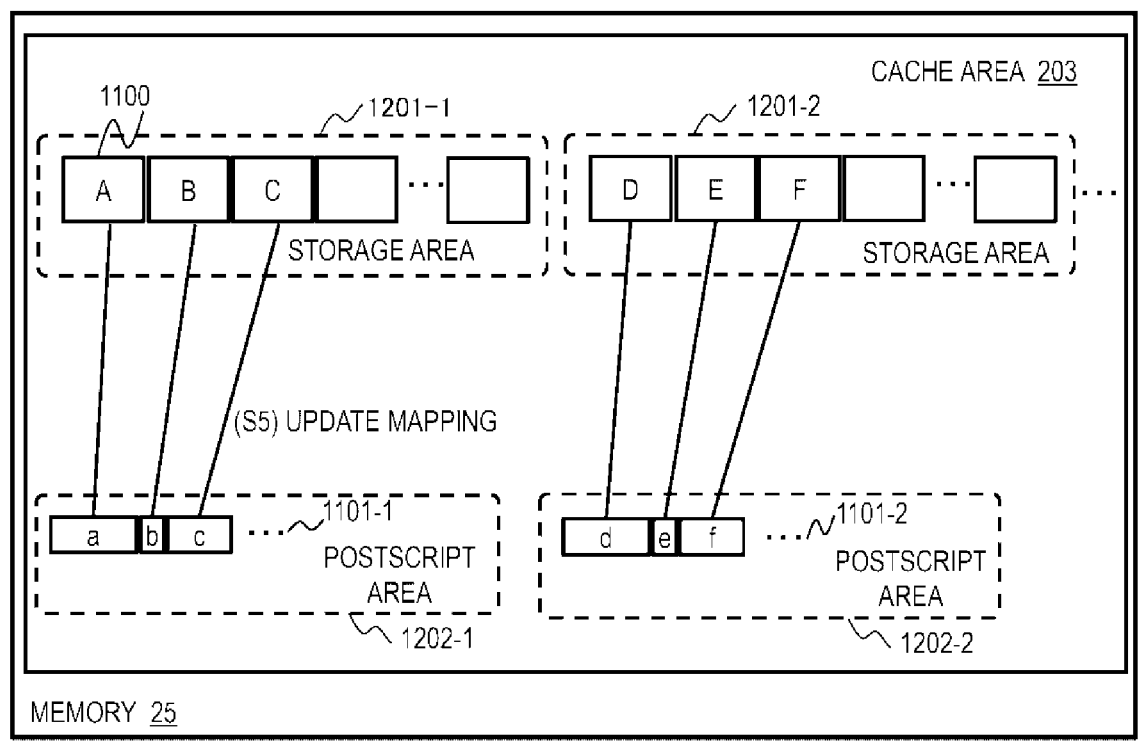
FIG. 9 is a diagram showing an example of the configuration of a tier management table held in the storage device according to the first embodiment of the invention.
FIG. 10 is a diagram showing an example of the configuration of cache area allocation in the storage device according to the first embodiment of the invention.

FIG. 9 is a diagram showing an example of the configuration of the tier management table 212 held in the storage device 11 according to the first embodiment of the invention.

The tier management table 212 has an entry for each storage area 1201 (page: an address range including a plurality of slots). Each entry shows information of VOL_ID 91, storage area VOL address 92, number of write I/O 93, number of read I/O 94, I/O frequency 95, and virtual tier arrangement 96. Hereinafter, one storage area VOL address (a "target VOL address" in the description of FIG. 9) will be described as an example.

The VOL_ID 91 is an ID of a VOL to which a page identified by the target VOL address belongs. The storage area VOL address 92 is the target VOL address. The number of write I/O 93 shows the totalized number of times of writing per unit time after the target VOL address is specified. The number of read I/O 94 shows the totalized number of times of reading per unit time after the target VOL address is specified.

The I/O frequency 95 shows I/O load frequency per unit time calculated based on the number of write I/O 93 and the number of read I/O 94 according to a predetermined calculation formula. For example, a sum of a value obtained by multiplying the number of write I/O 93 by a coefficient 1 and a value obtained by multiplying the number of read I/O 94 by a coefficient 2 may be calculated as the I/O frequency 95. It should be noted that the I/O frequency 95 is not limited to the above calculation, and may be calculated by a statistical method such as an averaging method.

The virtual tier arrangement 96 shows a tier arrangement suitable for storing data determined by the storage controller 22 based on the I/O frequency 95. If a value of the I/O frequency 95 is high, the data is stored in Tier_1 (1200-1) which is an upper tier, and if a value of the I/O frequency 95 is low, the data is stored in Tier_2 (1200-2) which is a lower tier. It should be noted that whether the I/O frequency 95 is high or low may be determined as a page of the I/O frequency 95 higher than a predetermined page number from a sorting result, or may be determined using any threshold. Since an upper limit of the number of pages that can be arranged in the upper tier depends on a compression rate of the data, the upper limit may be derived from the size after compression 76 in the pool allocation management table 210 or the usage capacity 66 in the RAID configuration management table 209.

FIG. 10 is a diagram showing an example of the configuration of cache area allocation in the storage device 11 according to the first embodiment of the invention.

The cache area 203 provides, to the storage controller 22, storage areas 1201-1 and 1201-2 where uncompressed data is stored and which are virtual address spaces corresponding to the VOL 1000, and postscript areas 1202-1 and 1202-2 where compressed data is stored and which corresponds to a pool address.

The storage area 1201 corresponding to a VOL address specified by the host computer 30 is allocated according to a write command from the host computer 30 to the storage controller 22. After data is compressed, the storage controller 22 stores the compressed data in the postscript area 1202 corresponding to a pool address in the cache area 203. At this time, the postscript area 1202 is determined based on the virtual tier arrangement 96 in the tier management table 212 of a page corresponding to the VOL address, and data is stored in the postscript areas 1202-1 or 1202-2.

In the example of FIG. 10, data written in the storage area 1201-1 is to be stored in the postscript area 1202-1, and data written in the storage area 1201-2 is to be stored in the postscript area 1202-2. The allocation of the VOL address and the pool address is managed by the pool allocation management table 210. In the postscript area 1202, when a data volume post-scribed in the area reaches the size of a parity cycle, a parity 1104 that does not correspond to the storage area 1201 is generated via the processor 24.

Hereinafter, a processing executed in the first embodiment will be described as an example.

(Read Processing)

Figure 11:
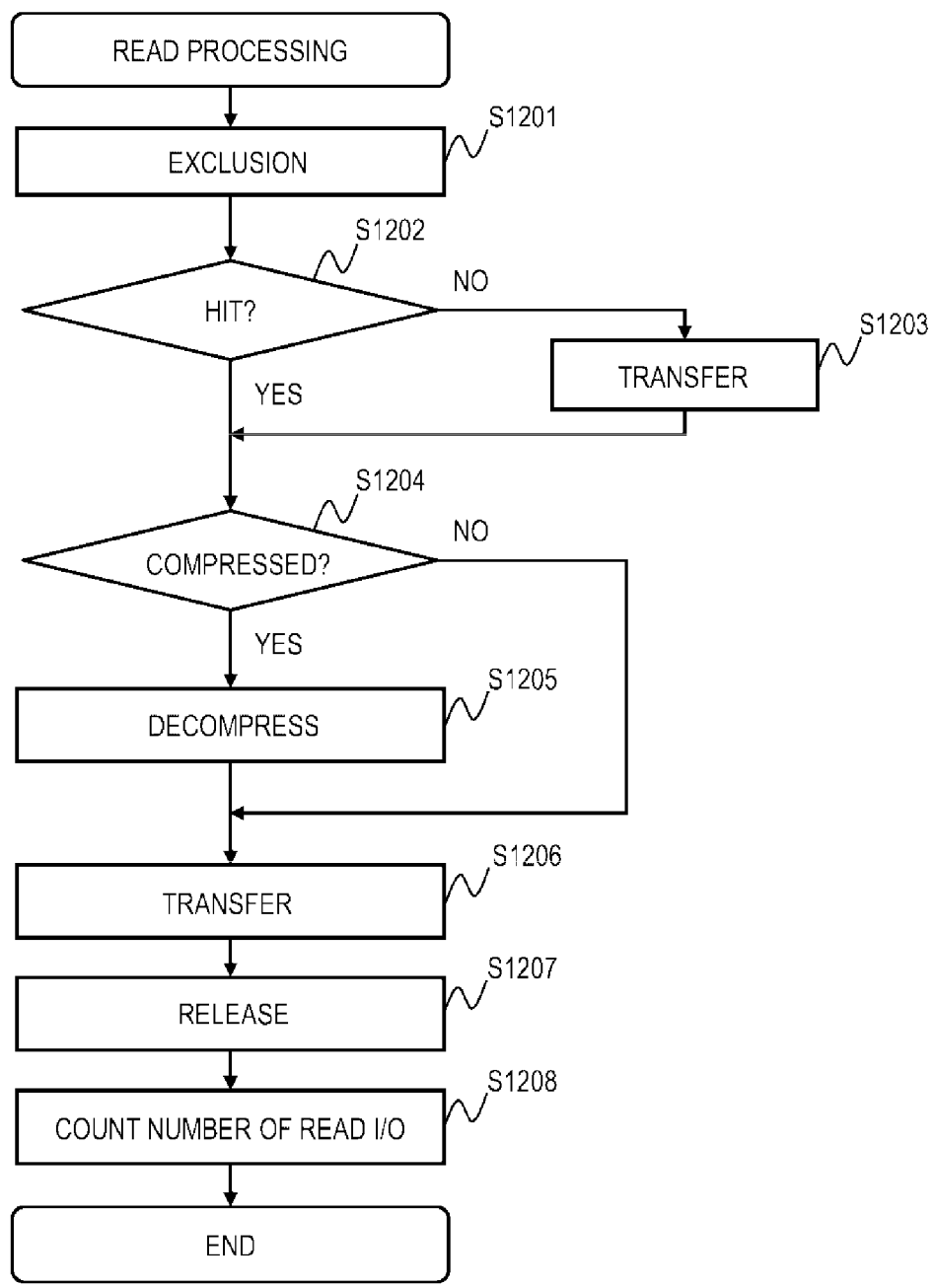
FIG. 11 is a flowchart showing a read processing executed by the storage device according to the first embodiment of the invention.

FIG. 11 is a flowchart showing a read processing executed by the storage device 11 according to the first embodiment of the invention.

The read processing is started when the storage device 11 receives a read command from the host computer 30 via the network 31. The read command specifies, for example, a virtual ID (for example, a virtual VOL_ID), an address, and a data size.

In step S1201, the processor 24 secures exclusion of a slot specified by the read command. When the exclusion of the slot is secured by another processing at the time of securing the exclusion of the slot, the processor 24 waits for a certain period of time, and then executes step S1201. It should be noted that the exclusion indicates that access to an area (slot) is prohibited.

In step S1202, the processor 24 determines whether read data is in the cache area 203. When a determination result of step S1202 is true (YES), the processing proceeds to step S1204. When the determination result of step S1202 is false (NO), the processor 24 transfers the read data from a RAID group to the buffer area 202 in step S1203.

At this time, the processor 24 specifies the pool ID 73, the pool address 74, and the size after compression 76 in the pool allocation management table 210 from the VOL_ID and the VOL address specified by the host computer 30, and refers to the drive ID 84 and the drive address 85 in the drive allocation management table 211 to specify a data storage position and a data size.

In step S1204, the processor 24 determines whether the read data in the buffer area 202 is compressed based on the size after compression 76. If the read data is compressed, the read data is decompressed in step S1205, and if the read data is not compressed, step S1205 is skipped.

In step S1206, the processor 24 transfers the read data in the buffer area 202 to the host computer 30. When data transfer in step S1206 is completed, the host computer 30 determines that the read processing is completed.

After that, in step S1207, the processor 24 releases slot exclusion that has been secured. After step S1207 is completed, the processor 24 determines that the read processing is completed. In step S1208, the processor 24 specifies the storage area VOL address 92 in the tier management table 212 to which a slot which is a reading target belongs, counts up the number of read I/O 94, and ends the processing.

(Write Processing)

Figure 12:
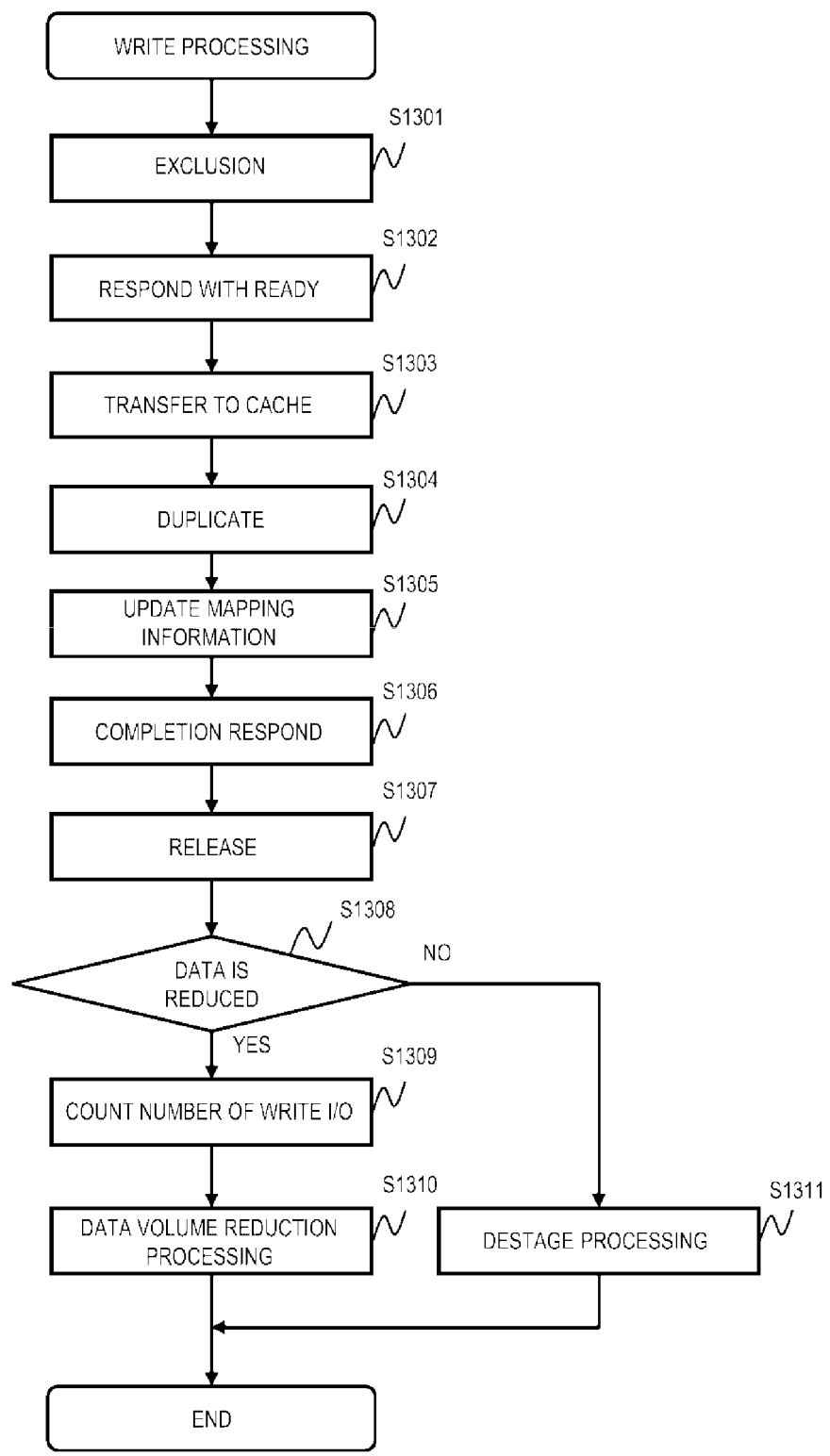
FIG. 12 is a flowchart showing a write processing executed by the storage device according to the first embodiment of the invention.

FIG. 12 is a flowchart showing a write processing executed by the storage device 11 according to the first embodiment of the invention.

The write processing is started when the storage device 11 receives a write command from the host computer 30. In the following description, the plurality of storage controllers 22 are described as a storage controller 1_22A and a storage controller 2_22B for the purpose of distinction, for example. Further, those belonging to the storage controller 1_22A and the storage controller 2_22B are distinguished by adding reference numerals "A" and "B" respectively, for example, the processor 24 is described as a processor 24A.

The write command from the host computer 30 includes a data allocation (storage) destination address. In step S1301, the storage device 11 secures exclusion of a slot indicated by an allocation destination address 1100. After securing the exclusion of the slot, the processor 24A allocates the slot to a cache area 203A which is a write destination of data.

In step S1302, the processor 24A responds to the host computer 30 with "Ready" indicating that the preparation for the write processing is done. The processor 24A accepts write data from the host computer 30 after receiving "Ready".

In step S1303, the processor 24A stores the accepted write data in the cache area 203A where the slot is allocated. In step S1304, the write data stored in the cache area 203A is transferred from the storage controller 1_22A to the storage controller 2_22B, and duplication is executed by storing the write data in the cache area 203B.

In step S1305, the processor 24A updates the queue state 77 in the pool allocation management table 210. It should be noted that the write data is not compressed yet in this case. Therefore, there is no value of the size after compression 76 corresponding to the slot allocated as the write destination of the data. Further, the queue state 77 is a "Dirty" state waiting for a destage processing which is writing to the drive 29, and the data remains in the cache area 203A and the cache area 203B.

After the duplication is completed and mapping information is updated, in step S1306, the storage device 11 returns a completion response indicating that the write processing is completed to the host computer 30 via the network 31. When the completion response is returned, in step S1307, the storage device 11 releases the exclusion of the slot which has been secured.

In step S1308, the processor 24A determines that whether data is reduced by referring to the VOL attribute 42 corresponding to the VOL ID 41 which is a writing target in the VOL management table 207.

When the VOL attribute 42 shows that data reduction is invalidated and the automatic tier management 55 in the pool configuration management table 208 is ON, the processor 24A determines a tier by an automatic tier management function of related art according to the totalizing method described in Patent Literature 2. In step S1311, the processor 24A executes the destage processing on a determined tier.

When the VOL attribute 42 shows that data reduction is validated in step S1308, the processor 24A specifies the storage area VOL address 92 in the tier management table 212 corresponding to the slot and counts up the number of write I/O 93 in step S1309. Next, a data volume reduction processing is executed in step S1310.

(Destage Processing)

Figure 13:
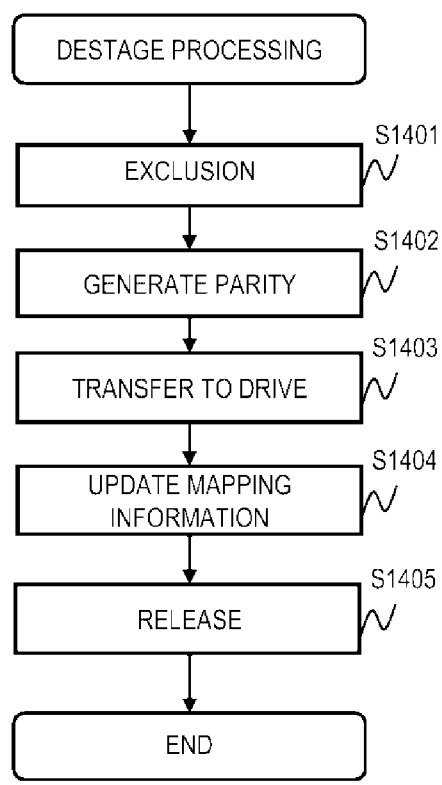
FIG. 13 is a flowchart showing a destage processing executed by the storage device according to the first embodiment of the invention.

FIG. 13 is a flowchart showing the destage processing executed by the storage device 11 according to the first embodiment of the invention.

After the write command from the host computer 30 to the storage device 11 is completed, the destage processing is executed in step 1311 in FIG. 12. It should be noted that the destage processing may be executed asynchronously after the write command is completed. Further, the destage processing may be started in response to the write command, or whether the destage processing needs to be activated may be determined based on a periodic activation, a consumption volume in the cache area 203, and the like. Target data of the destage processing is selected from the storage area 1201 if data reduction is invalidated and is selected from the postscript area 1202 if data reduction is validated.

When the destage processing is started, the processor 24A secures exclusion of a slot in a target range of the destage processing in the cache area 203 in step S1401. When data reduction is invalidated, since the related postscript writing is not used, a storage position of the drive 29 of a destage destination is discontinuous except for writing to a continuous area (sequential writing). Therefore, in step S1402, parity is generated and the processor 24A reads out data necessary for a parity calculation from the drive 29.

On the other hand, when data reduction is validated, since the postscript writing method is used, parity is generated from a data string (stripe string) in which data for a parity cycle is lined up. In step S1403, the processor 24A writes a target data string and the generated parity data to the drive 29.

In step S1404, the processor 24A updates the queue state 77 in the pool allocation management table 210. In this case, the queue state 77 is updated to "Clean". In step S1405, the processor 24A releases the exclusion of the slot in a range of destage, and ends the processing.

(Data Volume Reduction Processing)

Figure 14:
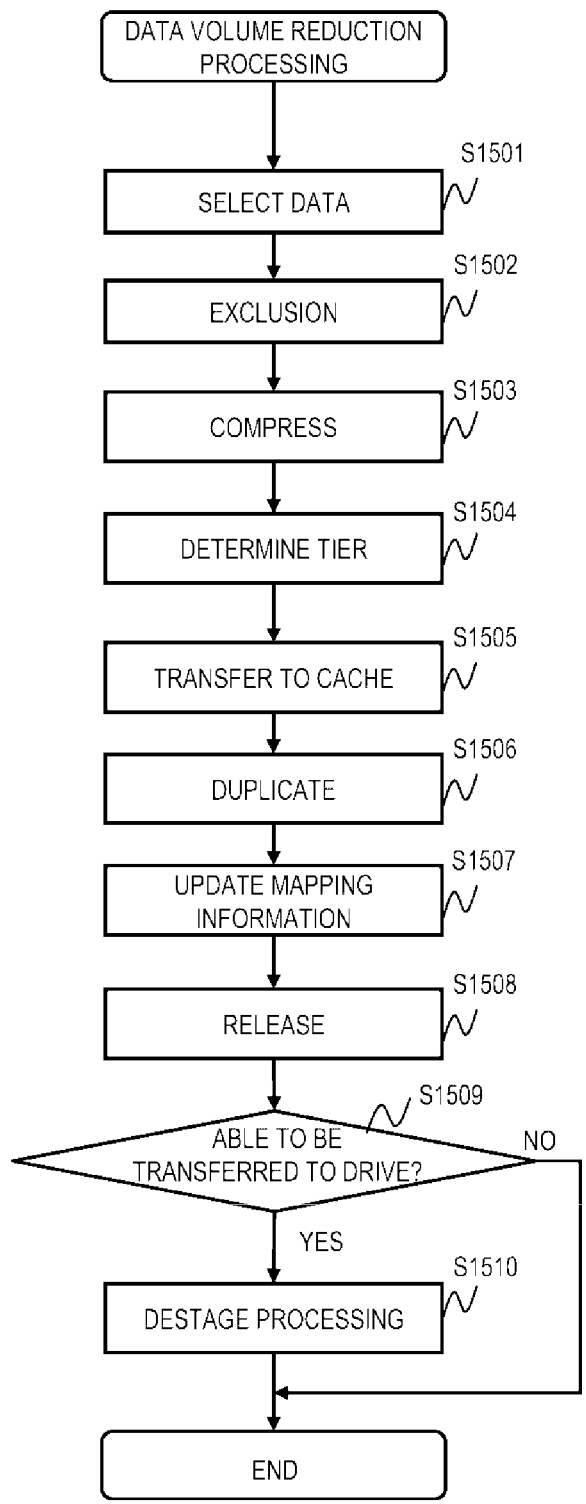
FIG. 14 is a flowchart showing a data volume reduction processing executed by the storage device according to the first embodiment of the invention.

FIG. 14 is a flowchart showing the data volume reduction processing executed by the storage device 11 according to the first embodiment of the invention.

As described in step 1310 in FIG. 12, the data volume reduction processing may be started in response to completion of the write command, or whether the data volume reduction processing needs to be activated may be determined based on a periodic activation, a consumption volume in the cache area 203, and the like.

The data volume reduction processing is executed on data in a "Dirty" state in the storage area 1201 of the VOL 1000 where data reduction is validated. The compression shown in the flowchart is an example in which a predetermined processing is executed on the write data. In addition to the compression, the processor 24A may execute a processing such as deduplication, encryption, or redundancy.

In step S1501, the processor 24A selects data whose size after compression 76 is invalidated and queue state 77 is in "Dirty" state in the pool allocation management table 210. Next, in step S1502, the processor 24A obtains the exclusion of a slot of the selected data.

Next, in step S1503, the processor 24A reads the data for which exclusion has been obtained into a buffer area 202A and compresses the data in the buffer area 202A. In step S1504, the processor 24A determines the virtual tier arrangement 96 of the storage area VOL address 92 corresponding to the VOL address 72 of a target slot.

When there is no value in an initial state such as a state in which the virtual tier arrangement 96 is allocated for the first time, the processor 24A determines that there is an available capacity based on the capacity 65 and the usage capacity 66 in the RAID configuration management table 209, and registers an available upper tier (Tier 1_1200-1) in the virtual tier arrangement 96.

Although performance of the storage system is improved by allocating data preferentially from the upper tier, the processor 24A selects an available lower tier when the upper tier is not available. When there is no available capacity in all tiers, there is no storage destination in the drive 29 for the data whose data volume is reduced. Therefore, the processing is interrupted to wait for a capacity recovery processing such as garbage collection which is activated asynchronously with I/O.

The processor 24A allocates the postscript area 1202 corresponding to the determined virtual tier arrangement 96, and in step S1505, transfers the compressed data on the buffer area 202A to a postscript area 1202A in the cache area 203A.

Although tier arrangement is changed according to an I/O load in the first embodiment, a tier of the storage destination may be fixed, for example, by specifying the upper tier as a VOL policy. When data transfer is completed, in step S1506, the processor 24A transfers duplicated data to a cache area 203B and stores the compressed data in a postscript area 1202B.

Then, in step S1507, the processor 24A updates mapping of the pool address 74 (logical storage position) to the VOL address 72 (virtual storage position), and the size after compression 76 in the pool allocation management table 210.

Next, in step S1508, the processor 24A releases the exclusion of the target slot and completes the data volume reduction. In step S1509, whether data stored in the postscript area 1202 of the cache area 203 has reached the parity cycle is determined. If a determination result is true, the above-described destage processing is executed in step S1510, and if the determination result is false, the processing ends.

(Tier Rearrangement Processing)

Figure 15:
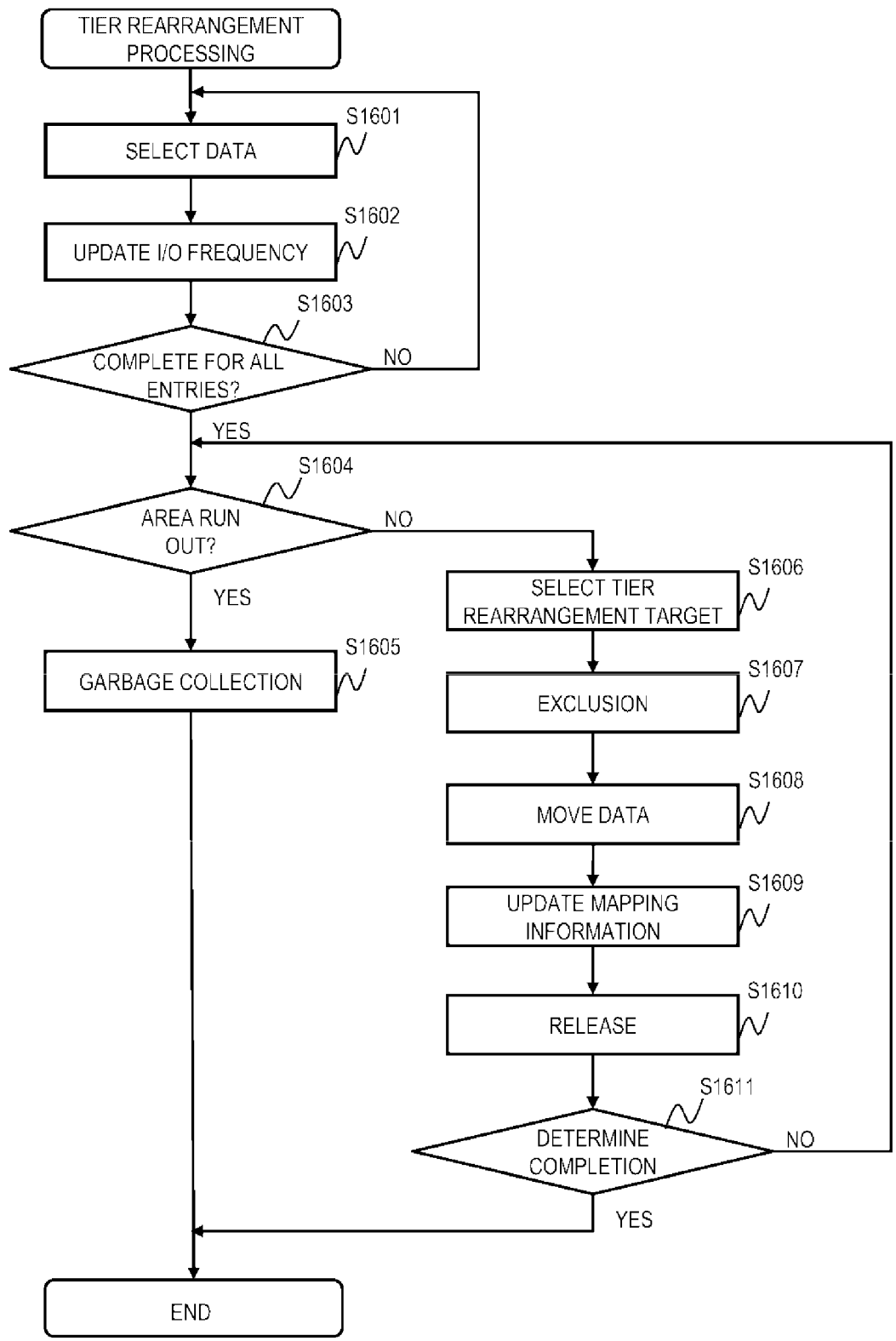
FIG. 15 is a flowchart showing a tier rearrangement processing executed by the storage device according to the first embodiment of the invention.

FIG. 15 is a flowchart showing a tier rearrangement processing executed by the storage device 11 according to the first embodiment of the invention.

The tier rearrangement processing is periodically activated based on a totalizing cycle of the I/O frequency 95. It should be noted that the totalizing cycle of the I/O frequency 95 is a preset cycle such as one hour.

In step S1601, the processor 24A selects an entry in the tier management table 212. The entry selected by the processor 24A is selected in a sequential order, for example, from the top entry.

Next, in step S1602, the processor 24A calculates the I/O frequency 95 as the above-described sum according to a predetermined calculation formula based on the number of write I/O 93 and the number of read I/O 94, and registers in the I/O frequency 95. Then, the processor 24A resets the number of write I/O 93 and the number of read I/O 94 to zero.

The processor 24A executes the above processing for all entries in the tier management table 212, and determines whether execution is completed in step S1603. When the I/O frequency 95 of all entries is calculated, the processor 24A then determines whether there is an available area in a tier which is a rearrangement destination of the data in step S1604.

In the tier rearrangement processing, data is preferentially allocated from an upper tier in order to improve I/O performance of the storage system. The rearrangement first executes demotion from an upper tier to a lower tier, and then executes promotion from a lower tier to an upper tier.

First, with regard to the RAID group 1002 in the RAID configuration management table 209, the processor 24A determines whether there is an available capacity in a demotion destination based on the capacity 65 and the usage capacity 66 of a RAID group ID_2 which is regarded as a lower tier (S1604).

If a difference (available capacity) between the capacity 65 and the usage capacity 66 is less than a predetermined threshold, the processor 24A determines that there is no available capacity and areas run out. Since data rearrangement cannot be executed, the processing is interrupted. In step S1605, area recovery is executed by the garbage collection processing.

On the other hand, if the available capacity is equal to or greater than the predetermined threshold, the processor 24A determines that there is an available area, and selects an entry to be a rearrangement target from the tier management table 212 based on the calculated I/O frequency 95 in step S1606.

As a method of selecting the entry which is a rearrangement target, a result obtained by sorting the tier management table 212 by values of the I/O frequency 95 may be used, or any threshold value may be used to compare with the entry. Further, in addition to the I/O frequency 95, I/O frequency of a plurality of cycles such as a short cycle or a long cycle, or a compression rate of data in a page obtained from the pool allocation management table 210 may also be used. When the above-mentioned result obtained by sorting is used, the processor 24A moves data that is arranged in the Tier 1_1200-1 where the I/O frequency 95 is low to the Tier 2_1200-2, and moves data that is arranged in the Tier 2_1200-2 where the I/O frequency 95 is high to the Tier 1_1200-1.

In step S1607, the processor 24A obtains exclusion of a slot of data belonging to the selected entry. Next, in step S1608, the processor 24A moves compressed data to the postscript area 1202 corresponding to a rearrangement destination.

When the movement of the data is completed, the processor 24A updates mapping information of the pool allocation management table 210 in step S1609. That is, the processor 24A updates the pool address 74 in the pool allocation management table 210 to an address of a movement destination of the data. Accordingly, the VOL address 72 can maintain an original address, and the I/O frequency 95 can be continuously detected even when tiers are changed.

Next, in step S1610, the processor 24A releases the exclusion of the slot of the data which has been rearranged. In step S1611, the processor 24A determines whether the rearrangement processing is completed in entries of a rearrangement target.

Determining whether the rearrangement is completed includes determining whether both demotion and promotion of the rearrangement for any entry are completed, in addition to determining that the rearrangement for a slot belonging to an entry which is selected as a target is completed. When the rearrangement is not completed, the processor 24A returns to step S1604 and repeats the above processings. When the rearrangement is completed, the processor 24A ends the rearrangement processing.

When it is determined that areas run out in step S1604, the processing is interrupted even in the middle of rearranging the slot in the entry of the tier management table 212 such that the virtual tier arrangement 96 and the physical tier arrangement are allowed to deviate from each other.

In S1607, the necessity of the data reduction processing such as data compression, encryption, deduplication, and redundancy may be changed when a data tier is changed and moved. In a case of compression, a change in compression rate may be included. This is because an I/O speed is generally slow when the data reduction processing is executed. The necessity of the data reduction processing may be individually determined for each data, or may be set in units of Tier. For example, in the case of data compression, when data is moved to Tier of upper level, the compressed data that is stored in a storage medium in Tier of lower level is decompressed to be stored in a storage medium in the Tier of upper level, and when data is moved to Tier of lower level, the compressed data that is stored in a storage medium in Tier of upper level is further compressed with a high compression rate to be stored in a storage medium in the Tier of lower level.

Data is moved between a tier (Tier 1_1200-1) having high performance and a tier (Tier 2_1200-2) having low performance according to the I/O frequency 95 by the above processing to implement optimal data arrangement.

(Garbage Collection)

Figure 16:
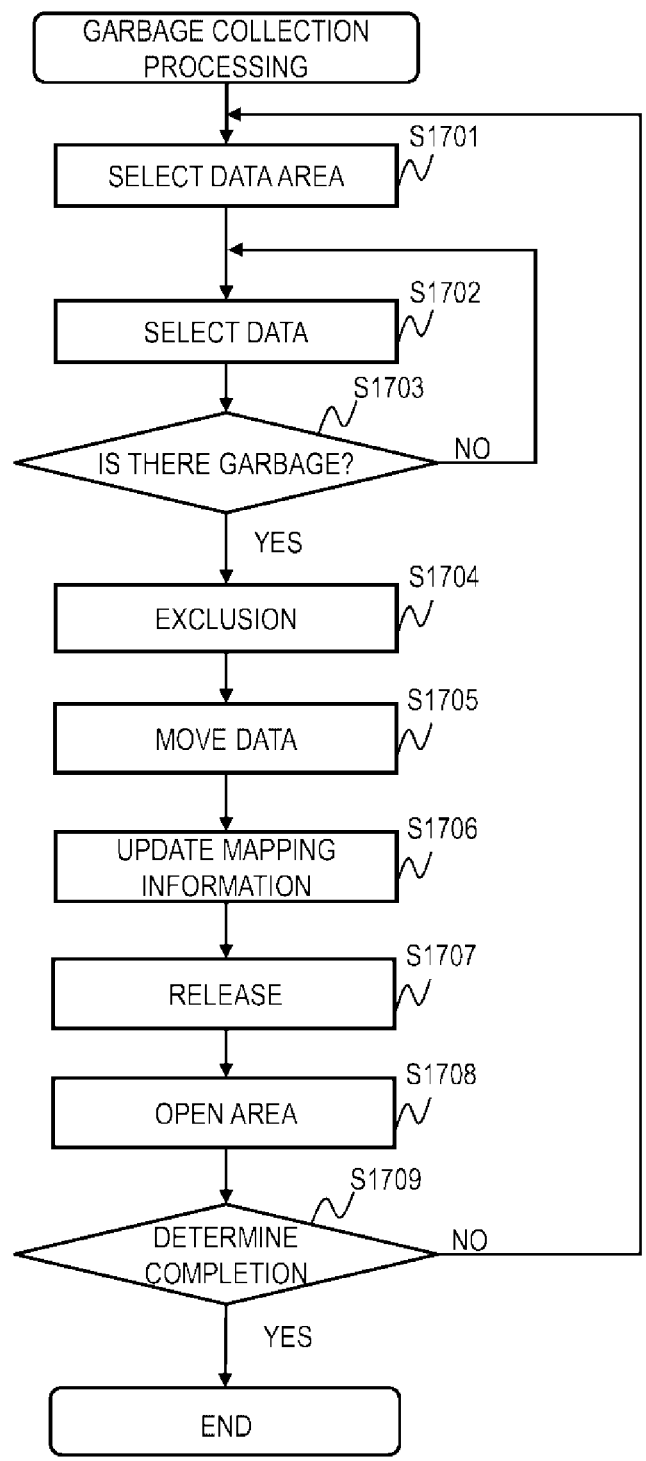
FIG. 16 is a flowchart showing a garbage collection processing executed by the storage device according to the first embodiment of the invention.

FIG. 16 is a flowchart showing the garbage collection processing executed by the storage device 11 according to the first embodiment of the invention.

The garbage collection processing is executed in step S1605 in FIG. 15, in addition, the garbage collection processing may be started in response to the completion of the write command. Further, the garbage collection processing may be periodically activated or may be started after the tier rearrangement processing. The necessity of activation may be determined based on the pool usage capacity 54 in the pool configuration management table 208 and the usage capacity 66 in the RAID configuration management table 209.

In step S1701, the processor 24A selects a postscript area 1202 to be subjected to the garbage collection from a plurality of postscript areas 1202. The postscript area 1202 to be subjected to the garbage collection may be specified when the garbage collection is activated. Alternatively, the processor 24A may select from the plurality of postscript areas 1202 using a method such as a round robin.

Next, in step S1702, the processor 24A selects a predetermined page range in a selected postscript area 1202. As a method of improving efficiency of capacity recovery of the garbage collection, the processor 24A can execute the garbage collection preferentially on a page having a large volume of garbage by dividing data in the postscript area 1202 in a predetermined range and totalizing the volume of garbage in the page.

In step S1703, the processor 24A determines whether there is garbage in the selected page. A garbage determination is executed in units of slots by the processor 24A based on a reference relationship from the postscript area 1202A to the storage area 1201A, or the presence or absence of the pool address 74 in the pool allocation management table 210.

When there is no garbage in the selected page, the processor 24A repeats the processing from step S1702 up to the end (1101) of the postscript area 1202A. When there is garbage in the selected page, the processor 24A obtains exclusion of the selected page in step S1704.

Next, in step S1705, the processor 24A sequentially post-scribes a valid slot in the page to the end (1101) of the postscript area 1202. Although a data (slot) movement is executed in the postscript area 1202 selected in step S1701, when the virtual tier arrangement 96 corresponding to the slot is different from a movement destination tier, the processor 24A may move data to the postscript area 1202 in the same tier with the virtual tier arrangement 96.

In step S1706, the processor 24A updates mapping information of the moved slot by rewriting the pool allocation management table 210. When the mapping information is updated, the processor 24A releases the exclusion of the page in step S1707.

Further, since there is only garbage in a target page at this time, the processor 24A deletes a target entry in the drive allocation management table 211 and releases the area in step S1708.

Finally, the processor 24A determines whether the garbage collection processing is executed up to the end (1101) of the postscript area 1202 in step S1709. If the garbage collection processing is in progress, the processor 24A returns to step S1701 and repeats the above processings. On the other hand, if the processing is completed up to the end (1101) of the postscript area 1202, the processor 24A ends the garbage collection processing.

As described above, the storage device 11 of the first embodiment includes a virtual storage area (VOL 1000) and a logical storage area (pool 1001) which are provided to the host computer 30. The logical storage area corresponds and manages a storage positon of a storage medium (drive 29) and a logical storage position. In the logical storage position, the storage device 11 manages a storage medium where data is stored in tiers (Tier 1200) having different performance, and determines a tier where the data is to be stored according to a data I/O load (I/O frequency 95) in the virtual storage area.

Accordingly, management information can be reduced by totalizing the number of I/O per virtual storage area (VOL 1000). Further, the data reduction technique and the automatic tier management function can be combined and a data hit rate in an upper tier can be increased by measuring the I/O load in the virtual storage area (VOL 1000).

Second Embodiment

A second embodiment of the invention will be described below.

(Method of Determining Tier for Data Referred from Positions)

Figure 17:
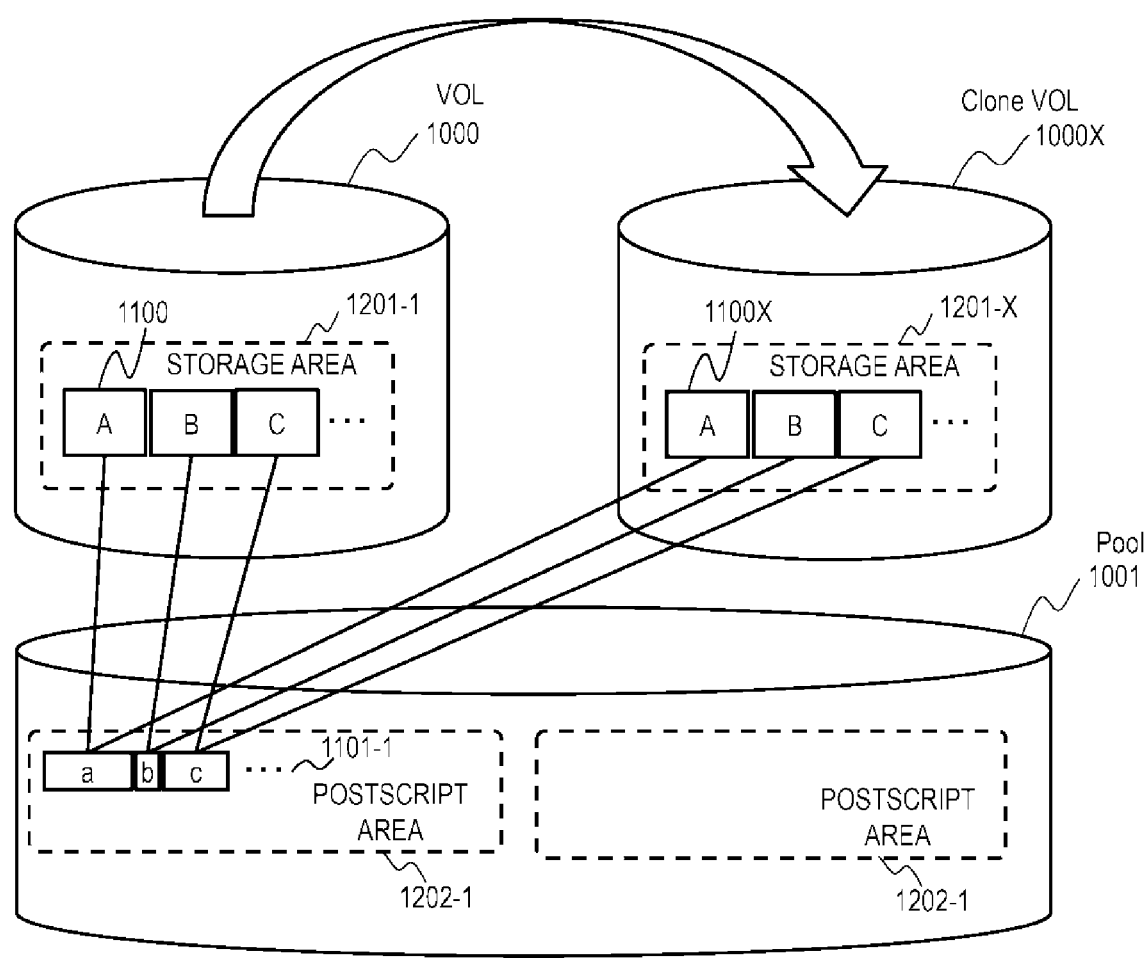
FIG. 17 is a diagram showing an example of a storage area of a storage device according to a second embodiment of the invention.

FIG. 17 is a diagram showing an example of the configuration of a clone VOL managed by the storage device 11 according to the second embodiment of the invention.

In the first embodiment, a mapping state of the data allocated to the postscript area 1202 and the storage area 1201 is a one-to-one corresponding state. However, the second embodiment shows a configuration indicates data a of one postscript area 1202 from a plurality of allocation destination addresses 1100 and 1100X in the storage area 1201 of deduplication, a shadow image obtained by copying a VOL image, a clone VOL_1000X obtained by duplicating a VOL, or the like.

In such a configuration, a method of determining a tier of physical data from the virtual tier arrangement 96 in the above-described tier management table 212 will be described below.

(S11): The processor 24 selects a top tier from the virtual tier arrangement 96 in each of the storage areas 1201 to which a plurality of slots belongs.

(S12): A tier is determined based on a sum of the I/O frequency 95 totalized with respect to each of the storage areas 1201 to which the plurality of slots belongs.

An area (common area) where only duplicated data referring to the plurality of slots is stored may be defined. In the common area, the storage area 1201 is not directly provided to the host computer 30, and only the read I/O is accepted from a reference destination of the duplicated data. Thus, by defining the virtual tier arrangement also for the storage area 1201 corresponding to the duplicated data, the tier management can be implemented by the same procedure with the first embodiment.

(Summary)

In the first and second embodiments, although tiers are distinguished by a drive type or a physical recording medium such as or an external connection storage, tiers are not limited thereto, and may be virtual tiers. For example, the upper tier and the lower tier may be classified according to a difference of a compression algorithm, the presence or absence of deduplication or encryption, or a data type.

Further, even if drive types are the same, tiers may be classified by an index such as a physical connection position of a drive or a lifespan of a drive. An I/O performance difference between tiers may be reversed due to a position of the FE_I/F 23 that receives the I/O and consumption of a drive lifespan, and a tier order may be reversed.

Further, although the postscript writing method is described in the first and second embodiments, the invention is not limited only to the postscript writing as long as the configuration is that the physical tier arrangement is determined based on the virtual tier arrangement. In addition, although the storage area 1201 and the postscript area 1202 are defined by the storage controller 22 in the first and second embodiments, the storage area 1201 and the postscript area 1202 are not limited to a physical position and may be defined in a controller of a recording medium such as the drive 29.

As described above, the storage devices 11 according to the first and second embodiments includes the processor 24, the memory 25, and a storage medium (the drive 29). The storage device 11 provides, to the external computer (the host computer 30), the first storage area (VOL 1000) that manages data in the virtual storage position (the VOL address 72), the tiers (Tier 1200) corresponding to different performance of the storage medium (the drive 29), the storage position (the drive address 85) of the storage medium, and the logical second storage area (the pool 1001) that manages data associated with the logical storage positions (the pool addresses 74 and 82). The processor 24 calculates the I/O load (I/O frequency 95) per data for the first storage area, and determines the tier where the data is stored according to the I/O load.

Accordingly, compared to a case where the related example is applied, management information can be reduced by calculating the I/O load in the first storage area that manages data in the virtual storage position. Further, the data reduction technique and the automatic tier arrangement function can be combined by managing data in the first storage area and the second storage area. The data hit rate in the upper tier can be improved.

In addition, the processor 24 calculates the I/O load for data in the first storage area at a predetermined cycle, and rearranges the tiers according to a change in the I/O load of the data. Accordingly, the data reduction technique and the automatic tier arrangement function can be combined and the data hit rate in the upper tier can be improved.

Further, the storage medium includes the physical data storage area (the RAID group 1002) for each of the tiers. When the tiers are rearranged, the processor 24 updates a corresponding relationship between the storage position of the storage medium (the drive address 85) and the logical storage position (the pool address 82), and a corresponding relationship between the virtual storage position (the VOL address 72) and the logical storage position (the pool address 74).

Accordingly, since the virtual storage position is linked to the same data, the storage device 11 can continue to calculate the I/O load by referring to the virtual storage position (drive address) even when the physical storage position of the data is changed.

Further, the processor 24 manages the second storage area by post-scribing, and post-scribes data that is moved between the tiers to the end of the second storage area when the tiers are rearranged. Accordingly, writing can be implemented by only post-scribing a change difference, and the processing speed can be increased.

Further, when the tiers are rearranged, the processor 24 changes the necessity of data reduction for the data that is moved between the tiers and stores the data in the second storage area. Accordingly, the data volume can be reduced according to the tiers.

It should be noted that the present invention is not limited to the embodiments described above, and includes various modifications. For example, the embodiments described above are described in detail for better understanding of the invention, and are not necessarily limited to the embodiments that include all the configurations described above.

Each of the configurations, functions, processing units, processing methods and the like described above may be partially or entirely implemented by hardware such as through design using an integrated circuit. The configurations, functions, and the like may also be implemented by software by means of interpreting and executing a program, by a processor, for implementing their respective functions. Information such as a program, a table, or a file for implementing each function can be stored in a storage device such as a nonvolatile semiconductor memory, a Hard Disk Drive, and a Solid State Drive (SSD), or a computer readable non-transitory data storage medium such as an IC card, an SD card, and a DVD.

Further, control lines and information lines show those considered to be necessary for the description, and not all the control lines and the information lines are necessarily shown on the product. In practice, it may be considered that almost all the configurations are connected to each other.

What is claimed is:

1. A storage system that includes a processor and a storage medium and manages and stores data in tiers, the storage system comprising:
    a first storage tier that includes a storage area for storing data, wherein the storage area in the first storage tier is not further divided into tiers; and
    a second storage tier that includes a storage area for storing the data which is moved from the storage area of the first storage tier, wherein the storage area in the second storage tier is further divided into tiers, wherein
    the processor
        calculates an input/output ("I/O") volume of the data in the first storage tier and determines a tier in the second storage tier where the data is to be stored based on the I/O volume, and
        changes the second storage tier based on the I/O volume, wherein
            a storage position of the data which is stored in the storage area of the first tier is not changed;
            a storage position of the data which is stored in the storage area of the second tier is changed; and
            the storage medium that physically stores the data is changed to a storage medium corresponding to the determined tier in the second storage tier.

2. The storage system according to claim 1, wherein a change of the data volume includes at least one of data compression, encryption, and data deduplication which reduce a data volume.

3. The storage system according to claim 1, wherein in the first storage tier, data is stored by overwriting, and in the second storage tier, data is stored by post-scribing.

4. The storage system according to claim 1, wherein data volume reduction that includes at least one of data compression, encryption, and data deduplication is executed to store data in the storage medium, when the determined tier in the second storage tier for storing the data is changed, necessity of applying the data volume reduction is changeable, and
    the data of the storage system is movable between the first storage tier and the second storage tier by performing processing of changing to apply or not to apply the data volume reduction.

5. The storage system according to claim 1, wherein the data in the first storage tier that includes the storage area is provided to an external computer, and
    an I/O volume of the data in the first storage tier is calculated based on a position of the first storage tier accessed by the external computer.

6. The storage system according to claim 1, wherein the change of the data volume is data deduplication, and
    the data in the second storage tier is associated with a plurality of data in the first storage tier, and
    a tier for the data in the second storage tier is determined based on a tier corresponding to a large I/O volume among tiers for a plurality of data in the first storage tier.

7. A data storage method of managing and storing data in tiers by using a storage system that includes a processor and a storage medium, wherein
    the storage system includes:
        a first storage tier that includes a storage area for storing data, wherein the storage area in the first storage tier is not further divided into tiers; and
        a second storage tier that includes a storage area for storing the data which is moved from the storage area of the first storage tier, wherein the storage area in the second storage tier is further divided into tiers, and
    the processor
        calculates an input/output ("I/O") volume of the data in the first storage tier and determines a tier in the second storage tier where the data is to be stored based on the I/O volume, and
        changes the second storage tier based on the I/O volume, wherein
            a storage position of the data which is stored in the storage area of the first tier is not changed;
            a storage position of the data which is stored in the storage area of the second tier is changed, and
            the storage medium that physically stores the data is changed to a storage medium corresponding to the determined tier in the second storage tier.

* * * * *